US012461463B2

(12) United States Patent
Nagaoka et al.

(10) Patent No.: US 12,461,463 B2
(45) Date of Patent: Nov. 4, 2025

(54) TONER

(71) Applicant: CANON KABUSHIKI KAISHA, Tokyo (JP)

(72) Inventors: Tomoya Nagaoka, Tokyo (JP); Takayuki Toyoda, Shizuoka (JP); Naoya Isono, Shizuoka (JP); Hirofumi Kyuushima, Tokyo (JP); Masao Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 666 days.

(21) Appl. No.: 17/804,880

(22) Filed: Jun. 1, 2022

(65) Prior Publication Data

US 2022/0404730 A1 Dec. 22, 2022

(30) Foreign Application Priority Data

Jun. 8, 2021 (JP) ................................ 2021-095997

(51) Int. Cl.

| | |
|---|---|
| ***G03G 9/097*** | (2006.01) |
| ***G03G 9/08*** | (2006.01) |
| ***G03G 9/087*** | (2006.01) |
| ***G03G 9/093*** | (2006.01) |

(52) U.S. Cl.

CPC ....... *G03G 9/09708* (2013.01); *G03G 9/0819* (2013.01); *G03G 9/0827* (2013.01); *G03G 9/08711* (2013.01); *G03G 9/08755* (2013.01); *G03G 9/09328* (2013.01); *G03G 9/09364* (2013.01); *G03G 9/09733* (2013.01)

(58) Field of Classification Search

CPC ............. G03G 9/09708; G03G 9/0819; G03G 9/0827; G03G 9/09328; G03G 9/09733; G03G 9/09716; G03G 9/09725

See application file for complete search history.

(56) References Cited

U.S. PATENT DOCUMENTS 7,141,342 B2 11/2006 Toyoda
7,264,910 B2 9/2007 Toyoda
7,288,357 B2 10/2007 Toyoda
7,482,105 B2 * 1/2009 Hirose et al. ............ G03G 9/08
7,833,685 B2 11/2010 Tanaka
7,833,687 B2 11/2010 Kato
8,211,606 B2 7/2012 Murai
8,367,289 B2 2/2013 Isono
8,377,616 B2 2/2013 Tani
8,440,382 B2 5/2013 Isono
8,497,054 B2 7/2013 Sugiyama
8,507,168 B2 8/2013 Hiraoka et al.
8,557,492 B2 10/2013 Hayashi et al.
8,628,899 B2 1/2014 Kawamura
8,652,737 B2 2/2014 Handa
8,697,327 B2 4/2014 Shibata
8,778,581 B2 7/2014 Nonaka
8,815,484 B2 8/2014 Tanaka
8,916,319 B2 12/2014 Ikeda
8,940,467 B2 1/2015 Hashimoto
9,146,485 B2 9/2015 Tani
9,158,216 B2 10/2015 Shimano
9,377,705 B2 6/2016 Shimano
9,383,668 B2 7/2016 Noji
9,500,972 B2 11/2016 Tanaka
9,556,290 B2 1/2017 Nishiura
9,575,424 B2 2/2017 Nakagawa
9,599,919 B2 3/2017 Isono
9,658,549 B2 5/2017 Tanaka
9,715,187 B2 7/2017 Mukumoto
9,785,068 B2 10/2017 Umeda
9,785,071 B2 10/2017 Shimano
9,829,814 B2 11/2017 Yoshida
9,829,816 B2 11/2017 Tanaka
9,835,964 B2 12/2017 Yoshida
9,857,711 B2 1/2018 Yoshida
9,904,193 B2 2/2018 Nakagawa
9,958,801 B2 5/2018 Tanaka
10,078,279 B2 9/2018 Nakagawa
10,101,681 B2 10/2018 Tagawa
10,151,990 B2 12/2018 Suzuki
10,216,107 B2 2/2019 Tsubaki
10,353,310 B2 7/2019 Fujita et al.
10,670,982 B2 6/2020 Yamashita et al.

(Continued)

FOREIGN PATENT DOCUMENTS

EP 1 950 260 A1 7/2008
JP 8-160660 A 6/1996

(Continued)

OTHER PUBLICATIONS

Cab-O-Sila® TS-720 Fumed Silica (Year: 2024).*
Cab-O-Sil TS-720 Fumed Silica (Year: 2024).*
U.S. Appl. No. 17/660,138, Keisuke Adachi, filed Apr. 21, 2022.
U.S. Appl. No. 17/804,879, Hirofumi Kyuushima, filed Jun. 1, 2022.
U.S. Appl. No. 17/804,882, Naoya Isono, filed Jun. 1, 2022.
U.S. Appl. No. 17/804,883, Takayuki Toyoda, filed Jun. 1, 2022.
U.S. Appl. No. 17/805,357, Kenji Aoki, filed Jun. 3, 2022.
Fedor, Robert F., A Method for Estimating Both the Solubility Parameters and Molar Volumes of Liquids, Pol. Eng. Sci, vol. 14, No. 2 (1984) 147-54.

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, and an external additive, wherein the toner particle further comprises a monohydric aliphatic alcohol, the monohydric aliphatic alcohol has 8 to 18 carbon atoms, a content ratio of the monohydric aliphatic alcohol extracted from the toner with ethanol is 30 to 300 ppm by mass in the toner, and the external additive comprises at least one selected from the group consisting of hydrotalcite particles and alumina particles.

14 Claims, 1 Drawing Sheet

(56) References Cited

U.S. PATENT DOCUMENTS

| | | | |
|---|---|---|---|
| 10,732,529 | B2 | 8/2020 | Yoshibu |
| 10,732,530 | B2 | 8/2020 | Matsui |
| 10,747,136 | B2 | 8/2020 | Kenmoku |
| 10,795,275 | B1 | 10/2020 | Srinivasan et al. |
| 10,877,388 | B2 | 12/2020 | Aoki |
| 10,877,389 | B2 | 12/2020 | Kamikura |
| 10,948,839 | B2 | 3/2021 | Tsubaki |
| 11,079,695 | B2 | 8/2021 | Sato |
| 11,086,242 | B2 | 8/2021 | Isono |
| 11,099,493 | B2 | 8/2021 | Komiya |
| 11,112,708 | B2 | 9/2021 | Uratani |
| 11,181,844 | B2 | 11/2021 | Nagaoka |
| 11,181,845 | B2 | 11/2021 | Shimoda |
| 11,249,412 | B2 | 2/2022 | Kawamura |
| 11,262,666 | B2 | 3/2022 | Yoshiba |
| 11,287,758 | B2 | 3/2022 | Matsui |
| 11,397,386 | B2 | 7/2022 | Kyuushima |
| 2006/0177754 | A1* | 8/2006 | Miyakawa et al. ...... G03G 9/08 |
| 2007/0111124 | A1 | 5/2007 | Yuasa |
| 2008/0299482 | A1 | 12/2008 | Kato |
| 2010/0035171 | A1 | 2/2010 | Watanabe |
| 2010/0159381 | A1 | 6/2010 | Takagi et al. |
| 2011/0143278 | A1 | 6/2011 | Iftime et al. |
| 2012/0301821 | A1 | 11/2012 | Kim et al. |
| 2013/0202998 | A1 | 8/2013 | Higashi |
| 2013/0252159 | A1 | 9/2013 | Kawakami |
| 2014/0356778 | A1 | 12/2014 | Wolfe et al. |
| 2014/0356779 | A1 | 12/2014 | Hasegawa |
| 2014/0377697 | A1 | 12/2014 | Nishiura |
| 2015/0004539 | A1 | 1/2015 | Watanabe |
| 2019/0040423 | A1 | 2/2019 | Noba et al. |
| 2019/0107792 | A1* | 4/2019 | Koyama ............ G03G 9/09708 |
| 2019/0258186 | A1 | 8/2019 | Yamashita et al. |
| 2020/0103776 | A1 | 4/2020 | Kinumatsu |
| 2020/0292956 | A1 | 9/2020 | Amano et al. |
| 2020/0341395 | A1 | 10/2020 | Ookubo |
| 2021/0132519 | A1 | 5/2021 | Hashimoto |
| 2021/0165364 | A1* | 6/2021 | Kinumatsu et al. ........................ G03G 21/1814 |
| 2021/0286281 | A1 | 9/2021 | Nishikawa |
| 2021/0286283 | A1 | 9/2021 | Nagaoka |
| 2021/0294238 | A1 | 9/2021 | Hashimoto |
| 2021/0302856 | A1 | 9/2021 | Nagashima |
| 2021/0311405 | A1 | 10/2021 | Shiotari |
| 2021/0318631 | A1 | 10/2021 | Isono |
| 2021/0405549 | A1 | 12/2021 | Ookubo |
| 2022/0075284 | A1 | 3/2022 | Nakayama |
| 2022/0128915 | A1 | 4/2022 | Toyoda |
| 2022/0128919 | A1 | 4/2022 | Kawamura |
| 2022/0146953 | A1 | 5/2022 | Kyuushima |
| 2022/0146954 | A1 | 5/2022 | Kato |
| 2022/0390871 | A1 | 12/2022 | Isono et al. |

FOREIGN PATENT DOCUMENTS

| | | | |
|---|---|---|---|
| JP | 2000-35692 | A | 2/2000 |
| JP | 2003-255586 | A | 9/2003 |
| JP | 2006-201563 | A | 8/2006 |
| JP | 2008-102396 | A | 5/2008 |
| JP | 2008-233567 | A | 10/2008 |
| JP | 2010-145946 | A | 7/2010 |
| JP | 4662475 | B2 | 3/2011 |
| JP | 2011-215311 | A | 10/2011 |
| JP | 2012-208219 | A | 10/2012 |
| JP | 2013-519116 | A | 5/2013 |
| JP | 2013-205593 | A | 10/2013 |
| JP | 2014-211560 | A | 11/2014 |
| JP | 2015-152784 | A | 8/2015 |
| JP | 2016-218208 | A | 12/2016 |
| JP | 2017-167524 | A | 9/2017 |
| JP | 2018-84774 | A | 5/2018 |
| JP | 2019-144437 | A | 8/2019 |
| JP | 2020-56914 | A | 4/2020 |
| JP | 2020-148928 | A | 9/2020 |

* cited by examiner

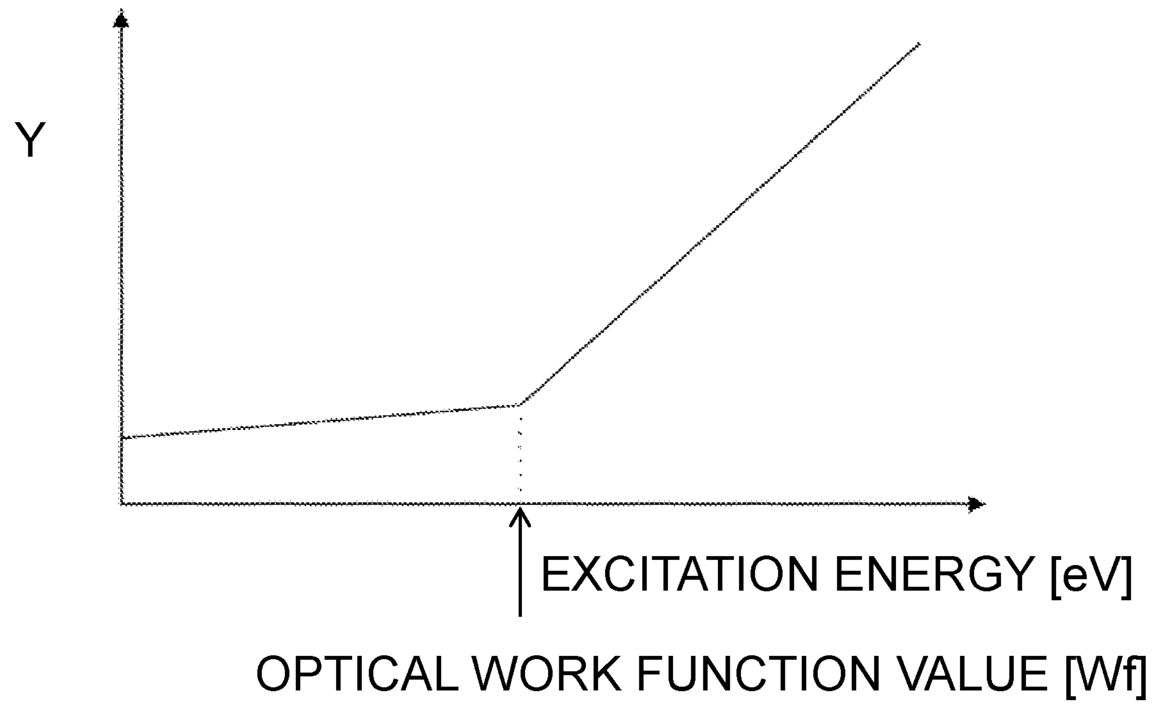
Y
EXCITATION ENERGY [eV]
OPTICAL WORK FUNCTION VALUE [Wf]

TONER

BACKGROUND OF THE INVENTION

Field of the Invention

The present disclosure relates to a toner suitable for an electrophotographic method, an electrostatic recording method, and a toner jet recording method.

Description of the Related Art

A demand for further improvement in performance of electrophotographic image forming apparatuses has been on the rise in recent years, and toners are also required to be further improved in various types of performance. From the viewpoint of image quality, the diversification of usage environment has increased a demand for maintaining the image quality at no less than a certain level for a long period of time (suppression of environmental dependence of image quality) in any usage environment. For example, in a high-temperature and high-humidity environment, deterioration of charging performance due to adsorption of moisture, and fusion due to out-migration of wax or oil tend to be problems. In a low-temperature and low-humidity environment, a decrease in flowability due to a charge-up of toner, and uneven density of an image due to non-uniformity of charging tend to be problems.

Conventionally, a charging aid such as a microcarrier has been used as an external additive in order to improve the charging performance in a high-temperature and high-humidity environment. However, where the charge quantity of the toner is simply increased, various problems such as charge-up in a low-temperature and low-humidity environment are likely to occur. Therefore, the environment dependence of image quality has been suppressed by controlling the characteristics of the toner base and the external additive.

Japanese Patent Application Publication No. 2000-035692 proposes suppressing the decrease in charge in a high-temperature and high-humidity environment by adding hydrotalcite as an external additive. In Japanese Patent Application Publication No. 2020-056914, the dielectric loss tangent is controlled by adding a magnetic substance to a toner particle, and the electrostatic offset in a low-temperature and low-humidity environment is suppressed.

SUMMARY OF THE INVENTION

The toner described in Japanese Patent Application Publication No. 2000-035692 suppresses fogging in a high-temperature and high-humidity environment. However, the rise-up of charging is a problem, and the density at the tips of the image tends to decrease in a high-temperature and high-humidity environment. In addition, charge-up occurs and ghosts are likely to occur in a low-temperature and low-humidity environment.

Meanwhile, the toner described in Japanese Patent Application Publication No. 2020-056914 suppresses fogging by suppressing overcharging, which tends to be a problem in a low-temperature and low-humidity environment. However, in a high-temperature and high-humidity environment, fogging is likely to occur due to insufficient charging, and there is room for improvement in the dependence of image quality on environment.

The present disclosure provides a toner that solves the abovementioned problems. Specifically, the present invention provides a toner capable of suppressing the uneven density, occurrence of fogging, and fusion during long-term use in a high-temperature and high-humidity environment and suppressing the occurrence of ghosts in a low-temperature and low-humidity environment.

The present disclosure relates to a toner comprising a toner particle comprising a binder resin, and an external additive, wherein the toner particle further comprises a monohydric aliphatic alcohol, the monohydric aliphatic alcohol has 8 to 18 carbon atoms, a content ratio of the monohydric aliphatic alcohol extracted from the toner with ethanol is 30 to 300 ppm by mass in the toner, and the external additive comprises at least one selected from the group consisting of hydrotalcite particles and alumina particles.

According to the present disclosure, it is possible to provide a toner capable of suppressing the uneven density, occurrence of fogging, and fusion during long-term use in a high-temperature and high-humidity environment and suppressing the occurrence of ghosts in a low-temperature and low-humidity environment.

Further features of the present invention will become apparent from the following description of exemplary embodiments with reference to the attached drawings.

BRIEF DESCRIPTION OF THE DRAWINGS

The FIGURE is an example of a work function measurement curve

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

Normally, hydrotalcite particles and alumina particles have a smaller work function than a toner particle and donate electrons to the toner particle. Therefore, by adding hydrotalcite particles or alumina particles as an external additive to the negative-charging toner, these particles act as microcarriers and have the effect of improving the charging performance of the toner. The microcarriers donate an electric charge and charge the toner particle as they separate from the toner particle. Therefore, in order to obtain a sufficient effect of improving the charging performance, it is required that the microcarriers be adhered to the toner particle before charging and be rapidly dissociated from the toner particle when charging is required.

However, where the adhesion between the microcarrier and the toner particle is weakened in order to obtain the above effect, the charge-providing effect at the time of dissociation becomes small, so that the charging performance at the initial stage of use tends to decrease. In addition, the microcarriers are separated from the toner particle in long-term use, and the charging performance of the toner tends to change during use.

Meanwhile, when the microcarriers are strongly adhered to the toner particle in order to improve the initial rise-up of charging and the change in charge due to durable use, the microcarriers are less likely to dissociate from the toner particle when charging is required, and the charging performance is likely to be lowered.

In addition, where the amount of microcarriers added is increased in order to further impart charging performance, a large effect is exerted in an environment where the charging performance tends to decrease, such as a high-temperature and high-humidity environment. Meanwhile, in an environment where the charging performance tends to be high, such as a low-temperature and low-humidity environment, charge-up tends to occur and image defects such as ghosts are likely to occur. Therefore, it is a big problem to maintain good charging performance for a long period of time regardless of the usage environment.

As a result of repeated studies, the present inventors have found that the above problem can be solved by adding a monohydric aliphatic alcohol to the toner, controlling the addition amount and the number of carbon atoms of the monohydric aliphatic alcohol within certain ranges, and adding hydrotalcite particles or alumina particles externally. Specifically, it has been found that the above problem can be solved by the following toner.

A toner comprising
- a toner particle comprising a binder resin, and
- an external additive, wherein
- the toner particle further comprises a monohydric aliphatic alcohol,
- the monohydric aliphatic alcohol has 8 to 18 carbon atoms,
- a content ratio of the monohydric aliphatic alcohol extracted from the toner with ethanol is 30 to 300 ppm by mass in the toner, and
- the external additive comprises at least one selected from the group consisting of hydrotalcite particles and alumina particles.

By adding a monohydric aliphatic alcohol to the toner, controlling the addition amount and the number of carbon atoms of the monohydric aliphatic alcohol within certain ranges, and adding hydrotalcite particles or alumina particles externally, it is possible to maintain good charging performance for a long period of time regardless of the usage environment. Specifically, the interaction between the alcohol and the hydrotalcite particles or the alumina particles can increase, as appropriate, the adhesion between the hydrotalcite particles or the alumina particles and the toner particle and makes it possible to obtain a large charge-providing effect at the time of dissociation. In addition, the alcohol makes the transfer of electric charge on the toner surface smooth and can suppress overcharging. Furthermore, by controlling the amount of alcohol added within a certain range, it is possible to suppress the out-migration of alcohol during durable use and suppress the fusion.

The monohydric aliphatic alcohol has 8 to 18, preferably 10 to 16, and more preferably 12 to 14 carbon atoms. When the number of carbon atoms is less than 8, alcohol out-migrates to the toner particle surface, and fogging and uneven density occur due to poor charging. In addition, long-term use causes fusion to a sleeve and a developing roller. When the number of carbon atoms is larger than 18, the dispersibility of the alcohol in the toner particle is reduced, and the alcohol forms domains. As a result, the interaction between the hydrotalcite particles or alumina particles and the alcohol becomes non-uniform, the charging performance degrades, and the charge distribution becomes broad.

The content ratio of the monohydric aliphatic alcohol extracted from the toner with ethanol is from 30 to 300 mass ppm, preferably from 70 to 250 mass ppm, and more preferably from 110 to 200 mass ppm.

When the content ratio of the monohydric aliphatic alcohol is less than 30 mass ppm, the interaction with the hydrotalcite particles or alumina particles is weak, and the adhesion between the toner particle and the hydrotalcite particles or alumina particles becomes small. As a result, the rise-up of charging of the toner is delayed, and initial density unevenness and fogging occur in a high-temperature and high-humidity environment.

When the content ratio of the monohydric aliphatic alcohol is more than 300 mass ppm, the monohydric aliphatic alcohol out-migrates to the toner particle surface, and fusion occurs after long-term use. In addition, the interaction between the monohydric aliphatic alcohol and the hydrotalcite particles or alumina particles becomes strong, and the adhesion between the toner particles and the hydrotalcite particles or alumina particles becomes too strong. As a result, initial density unevenness and fogging occur in a high-temperature and high-humidity environment.

The external additive is at least one selected from the group consisting of hydrotalcite particles and alumina particles. Hydrotalcite particles and alumina particles have a small work function and high positive charging performance. Therefore, by using such particles as an external additive, the negative charging performance of the toner can be enhanced. Further, hydrotalcite particles and alumina particles are easily adsorbed on the hydroxyl group of the alcohol. As a result, the external additive can interact with the alcohol in the toner particle to appropriately improve the adhesion, and it is easy to control the charging performance.

The number average value of major axes of at least one selected from the group consisting of hydrotalcite particles and alumina particles is preferably from 60 to 820 nm, and more preferably from 300 to 500 nm. When the number average value of major axes is within the above range, the toner particle and the hydrotalcite particles or alumina particles are appropriately adhered to each other, and the charge improving effect of the microcarrier is likely to be obtained. As a result, initial density unevenness and fogging can be further suppressed in a high-temperature and high-humidity environment. The number average value of major axes of the hydrotalcite particles can be controlled by changing the ratio and type of the compound added at the time of synthesis. Further, the number average value of major axes of alumina particles can be controlled by changing the reaction temperature and reaction time.

The total amount of the hydrotalcite particles and alumina particles is preferably 0.02 parts by mass or more, more preferably 0.03 parts by mass or more, still more preferably 0.05 parts by mass or more, and even more preferably 0.15 parts by mass or more with respect to 100 parts by mass of the toner particles. When the amount of the hydrotalcite particles and alumina particles added is in this range, the toner can exert a sufficiently improved charging performance, and fogging and initial concentration unevenness in a high-temperature and high-humidity environment can be further suppressed.

The total amount of the hydrotalcite particles and alumina particles is preferably 1.00 parts by mass or less, more preferably 0.80 parts by mass or less, still more preferably 0.50 parts by mass or less, and even more preferably 0.30 parts by mass or less with respect to 100 parts by mass of the toner particles. When the amount of the hydrotalcite particles and alumina particles is in this range, the charge-up in a low-temperature and low-humidity environment can be suppressed and the ghosts can be further suppressed.

The binder resin preferably includes a styrene acrylic resin. The content ratio of the styrene acrylic resin in the toner is preferably 50% by mass or more, more preferably 70% by mass or more, and further preferably 75% by mass or more. The upper limit is not particularly limited, but is preferably 90% by mass or less, and more preferably 85% by mass or less. When the content ratio of the styrene acrylic resin is within the above range, the dispersibility of the alcohol in the binder resin can be easily controlled, and the interaction between the hydrotalcite particles or alumina particles and the alcohol can be further enhanced.

Where the work function of the toner particle is denoted by Wa and the work function of the hydrotalcite particle or alumina particle is denoted by Wb, it is preferable that Wa−Wb satisfies the relationship of a following formula (1). More preferably, the relationship of a formula (1') is satisfied.

$$0.05\ \text{eV} < Wa - Wb < 0.50\ \text{eV} \quad (1)$$

$$0.10\ \text{eV} < Wa - Wb < 0.30\ \text{eV} \quad (1')$$

Where Wa−Wb is larger than 0.05 eV, the charging performance is improved and fogging can be further suppressed in a high-temperature and high-humidity environment. Further, when Wa−Wb is smaller than 0.50 eV, charge-up in a low-temperature and low-humidity environment can be suppressed, and ghosts can be further suppressed. The work function of the toner particle can be controlled by changing the type of the charge control agent or pigment used. For example, the work function Wa of the toner particle is preferably from 5.25 to 5.70 eV, and more preferably from 5.40 to 5.60 eV.

It is preferable that the external additive contain an external additive C different from the hydrotalcite particles and alumina particles, and where the work function of the external additive C is denoted by Wc, it is preferable that Wa, Wb and Wc satisfy the relationship of a following formula (2).

$$Wb < Wa < Wc \quad (2)$$

Where Wa, Wb, and Wc satisfy the relationship of the formula (2), the charge transfer on the toner surface becomes smooth and ghosts in a low-temperature and low-humidity environment can be further suppressed. When the external additive C is, for example, silica, the work function of the external additive C can be controlled by changing the type of the surface treatment agent.

At least one selected from the group consisting of hydrotalcite particles and alumina particles is preferably hydrotalcite particles. That is, the external additive preferably comprises hydrotalcite particles. The hydrotalcite particles have a greater interaction with alcohol and are more likely to improve the charging performance of the toner.

The average circularity of the toner is preferably 0.97 or more, and more preferably 0.98 or more. The upper limit is not particularly limited but is preferably from 1.00 to 0.99. When the average circularity of the toner is within the above range, the hydrotalcite particles or alumina particles are likely to be uniformly attached to the toner particle surface, and the charge of the toner is likely to be more uniform.

Hydrotalcite Particles

The hydrotalcite particles will be explained in detail. The hydrotalcite particles are not particularly limited as long as the characteristics can be achieved. The hydrotalcite particles preferably comprise Al and Mg. The hydrotalcite particle is preferably a layered inorganic compound that can be represented by a following formula (A) and has positively charged basic layers ($[M^{2+}{}_{1-x}M^{3+}{}_{x}(OH)^{-}{}_{2}]$ in the formula (A)) and negatively charged intermediate layers ($[x/nA^{n-}\cdot mH_2O]$ in the formula (A)).

$$[M^{2+}{}_{1-x}M^{3+}{}_{x}(OH)^{-}{}_{2}][x/nA^{n-}\cdot mH_2O] \quad (A)$$

In the formula (A), the divalent metal ion $M^{2+}$ can be exemplified by Mg, Zn, Ca, Ba, Ni, Sr, Cu, and Fe, and the trivalent metal ion $M^{3+}$ can be exemplified by Al, B, Ga, Fe, Co, and In. The divalent metal ions $M^{2+}$ and trivalent metal ions $M^{3+}$ may form a solid solution comprising a plurality of different elements and may comprise a trace amount of a monovalent metal ion in addition to these metal ions. $A^{n-}$ represents an n-valent anion such as $CO_3{}^{2-}$, $OH^-$, $Cl^-$, $I^-$, $F^-$, $Br^-$, $SO_4{}^{2-}$, $HCO_3{}^{2-}$, $CH_3COO^-$, $NO_3{}^-$, etc., and a single such anion or a plurality thereof may be present. An integer "m" in the formula (A) satisfies m≥0.

A compound included in the formula (A) may be exemplified by $[Mg^{2+}{}_{0.70}Al^{3+}{}_{0.250}(OH)^{-}{}_{2.000}]$ $[0.125CO_3{}^{2-}*0.500H_2O]$.

From the viewpoint of charge-providing ability, the hydrotalcite particles preferably comprise $Mg^{2+}$ as the divalent metal ion $M^{2+}$, and preferably comprise $Al^{3+}$ as the trivalent metal ion $M^{3+}$. Further, from the viewpoint of imparting charging performance to the toner particle, $CO_3{}^{2-}$ and $Cl^-$ are preferable as the n-valent anion.

The hydrotalcite particles may be treated with a surface treatment agent for the purpose of imparting hydrophobicity and controlling the charging performance, but from the viewpoint of maintaining the strong positive property which is responsible for the high charge-providing effect of the hydrotalcite particles, it is preferable to use the untreated hydrotalcite particles. When a surface treatment agent is to be used, higher fatty acids, coupling agents, esters, and oils such as silicone oil can be used.

A known method can be used for surface-treating hydrotalcite particles with a surface treatment agent. For example, the surface treatment agent may be dissolved and mixed in a solvent, or the surface treatment agent may be melted by heating to make it liquid and then wet-mixed with untreated hydrotalcite particles. In addition, a method of mechanically drying and mixing a fine powdered surface treatment agent and hydrotalcite particles can be mentioned. After the surface treatment, means such as washing, dehydration, drying, pulverization, and classification can be selected, as appropriate, to obtain surface-treated hydrotalcite particles.

The work function of hydrotalcite particles is preferably from 4.95 to 5.40 eV, and more preferably from 5.10 to 5.30 eV. When the work function of hydrotalcite particles is within the above range, it becomes easy to obtain the effect of a charging aid for a negative-charging toner. The work function of hydrotalcite particles can be controlled by changing the type and amount of the surface treatment agent, the types and ratios of $M^{2+}$ and $M^{3+}$ in the hydrotalcite particles, and the types of n-valent anions.

Alumina Particles

Next, the alumina particles will be described in detail. The alumina particles are not particularly limited as long as the characteristics can be achieved. A known method can be adopted for producing the alumina particles. For example, a Bayer method, an underwater spark discharge method, an aluminum alum pyrolysis method, an ammonium aluminum carbonate pyrolysis method, the method of firing alumina hydrate obtained by hydrolyzing an aluminum alkoxide, a chemical vapor deposition method, and the like can be mentioned. Among these, alumina particles produced by the chemical vapor deposition method are preferable because such particles have a polyhedral shape and the particle size distribution tends to be uniform.

Alumina particles may be treated with a surface treatment agent for the purpose of imparting hydrophobicity and controlling the charging performance, but from the viewpoint of maintaining the strong positive property which is responsible for the high charge-providing effect of the alumina particles, it is preferable to use the untreated alumina particles. When a surface treatment agent is to be used, a hydrophobizing oil, a coupling agent, and a hydrophobizing resin are preferable. Among these, silicone-based oils, coupling agents, organic acid-based resins and the like are preferably used. Examples of suitable oils include silicone oils such as dimethylpolysiloxane and methyl hydrogen polysiloxane, paraffin, mineral oils, and the like. The surface treatment of alumina particles with these hydrophobizing agents can be carried out by a known method.

The work function of alumina particles is preferably from 4.95 to 5.40 eV, and more preferably from 5.10 to 5.30 eV. When the work function of alumina particles is within the above range, it becomes easy to obtain the effect of a charging aid for a negative-charging toner. The work function of alumina particles can be controlled by changing the type and amount of the surface treatment agent and the crystal structure of alumina particles.

The raw materials to be used for the toner particle will be explained hereinbelow. The toner particle comprises a binder resin. The following polymers and the like can be used as the binder resin to be used for the toner particle.

Styrene and homopolymers of substitution products thereof such as polystyrene, poly-p-chlorostyrene, polyvinyl toluene, and the like; styrene-based copolymers such as styrene-p-chlorostyrene copolymer, styrene-vinyl toluene copolymer, styrene-vinyl naphthalin copolymer, styrene-acrylic acid ester copolymers, styrene-methacrylic acid ester copolymers, and the like; polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyethylene resin, polypropylene resin, and the like.

From the viewpoint of developing performance, fixing performance, and compatibility with monohydric aliphatic alcohols, it is preferable that the main component of the binder resin be a styrene-based copolymer, which is a copolymer of styrene and another vinyl monomer. More preferably, the main component is a styrene acrylic resin.

The toner particle comprises a monohydric aliphatic alcohol. Monohydric aliphatic alcohols are inclusive of both linear and branched aliphatic alcohols, and the monohydric aliphatic alcohols may be used alone or in combination of two or more. Examples of monohydric aliphatic alcohols having 8 to 18 carbon atoms include octyl alcohol, decyl alcohol, dodecyl alcohol, lauryl alcohol, myristyl alcohol, cetyl alcohol, and stearyl alcohol. Among them, linear aliphatic alcohols are preferable.

The toner particle may comprise a colorant. Examples of the colorant include the following. Examples of black colorant include carbon black and those colored black using a yellow colorant, a magenta colorant, and a cyan colorant. The pigment may be used alone as the colorant.

Pigments for magenta toners can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35. Dyes for magenta toners can be exemplified by the following: oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Pigments for cyan toners can be exemplified by the following: C. I. Pigment Blue 2, 3, 15:2, 15:3, 15:4, 16, and 17; C. I. Vat Blue 6; C. I. Acid Blue 45; and copper phthalocyanine pigments having at least 1 and not more than 5 phthalimidomethyl groups substituted on the phthalocyanine skeleton. C. I. Solvent Blue 70 is an example of a dye for cyan toners. Pigments for yellow toners can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185 and by C. I. Vat Yellow 1, 3, and 20. C. I. Solvent Yellow 162 is an example of a dye for yellow toners.

A single one of these colorants may be used or a mixture may be used and these colorants may also be used in a solid solution state. The colorant preferably includes at least one selected from the group consisting of C. I. Pigment Violet 19, C. I. Pigment Red 122, C. I. Pigment Red 202, and C. I. Pigment Red 209. The quinacridone skeleton contained in these colorants delocalizes the charge and makes it easier to suppress fogging. The amount of the colorant is preferably from 0.1 to 30.0 parts by mass with respect to 100.0 parts by mass of the binder resin. When the amount of the colorant is within the above range, it is easy to achieve a balance in terms of hue angle, saturation, lightness, light resistance, OHP transparency, and dispersibility in the toner.

It is also possible to include magnetic bodies in the toner particle, thereby obtaining a magnetic toner particle. Examples of magnetic bodies include iron oxides such as magnetite, hematite and ferrites; metals such as iron, cobalt and nickel, alloys of these metals and a metal such as aluminum, copper, magnesium, tin, zinc, beryllium, calcium, manganese, selenium, titanium, tungsten, and vanadium, and mixtures thereof. The magnetic bodies are preferably surface-modified magnetic bodies.

When a magnetic toner is prepared by a polymerization method, it is preferable that the magnetic toner be hydrophobized with a surface modifier which is a substance that does not inhibit polymerization. Examples of such a surface modifier include silane coupling agents and titanium coupling agents. The number average particle diameter of these magnetic bodies is preferably 2.0 μm or less, and more preferably from 0.1 to 0.5 The amount of the magnetic bodies is preferably from 20 to 200 parts by mass, and more preferably from 40 to 150 parts by mass with respect to 100 parts by mass of the binder resin.

The toner particle preferably comprises a release agent. Examples of the release agent include waxes including a fatty acid ester as the main component, such as carnauba wax, montanic acid ester wax, and the like; fatty acid esters from which an acid component has been partially or entirely removed, such as deoxidized carnauba wax and the like; methyl ester compounds having a hydroxy group which are obtained by hydrogenation of vegetable fats and oils; saturated fatty acid monoesters such as stearyl stearate, behenyl behenate, and the like; diesterification products of saturated aliphatic dicarboxylic acids and saturated aliphatic alcohols such as dibehenyl sebacate, distearyl dodecanedioate, distearyl octadecanedioate, and the like; aliphatic hydrocarbon waxes such as diesterification products of saturated aliphatic diols and saturated fatty acids such as nonanediol dibehenate, dodecanediol distearate, and the like, low molecular weight polyethylene, low molecular weight polypropylene, microcrystalline wax, paraffin wax, Fischer-Tropsch wax, and the like; oxides of aliphatic hydrocarbon waxes such as oxidized polyethylene wax and the like or block copolymers thereof; waxes obtained by grafting a vinyl monomer such as styrene, acrylic acid, and the like onto aliphatic hydrocarbon waxes; saturated linear fatty acids such as palmitic acid, stearic acid, montanic acid, and the like; unsaturated fatty acids such as brassidic acid, eleostearic acid, parinaric acid, and the like; saturated alcohols such as stearyl alcohol, aralkyl alcohol, behenyl alcohol, carnaubyl alcohol, ceryl alcohol, melissyl alcohol, and the like; polyhydric alcohols such as sorbitol and the like; fatty acid amides such as linoleic acid amide, oleic acid amide, lauric acid amide, and the like; saturated fatty acid bisamides such as methylene bisstearic acid amide, ethylene biscapric acid amide, ethylene bislauric acid amide, hexamethylene bisstearic acid amide, and the like; unsaturated fatty acid amides such as ethylene bisoleic acid amide, hexamethylene bisoleic acid amide, N,N'-dioleyl adipic acid amide, N,N'-dioleyl sebacic acid amide, and the like; aromatic bisamides such as m-xylene bisstearic acid amide, N,N'-dystearyl isophthalic acid amide, and the like; fatty acid metal salts (generally referred to as metal soaps) such as calcium stearate, calcium laurate, zinc stearate, magnesium stearate, and the like; long-chain alkyl alcohols or long-chain alkyl carboxylic acids with 12 or more carbon atoms; and the like.

The amount of the release agent in the toner particle is preferably 1.0% to 30.0% by mass, and more preferably 2.0% to 25.0% by mass.

The toner particle may contain a charge control agent. Examples of charge control agents that impart the toner particle with negative chargeability include the compounds listed below. Examples of organometallic compounds and chelate compounds include monoazo metal compounds, acetylacetone metal compounds, aromatic oxycarboxylic acids, aromatic dicarboxylic acids, and oxycarboxylic acid-based and dicarboxylic acid-based metal compounds. In addition, aromatic oxycarboxylic acids, aromatic monocarboxylic acids and polycarboxylic acids and its metal salts and anhydrides, phenol derivatives such as esters and bisphenols and the like, are also included. Further examples include urea derivatives, metal-containing salicylic acid-based compounds, metal-containing naphthoic acid-based compounds, boron compounds, quaternary ammonium salts and calixarene.

Meanwhile, examples of charge control agents that impart the toner particle with positive chargeability include the compounds listed below. Products modified by means of nigrosine and fatty acid metal salts; guanidine compounds; imidazole compounds; quaternary ammonium salts such as tributylbenzyl ammonium-1-hydroxy-4-naphthosulfonic acid salts, tetrabutyl ammonium tetrafluoroborate, (3-Acrylamidopropyl) trimethylammonium chloride, and analogs thereof; onium salts such as phosphonium salts, and lake pigments thereof; triphenylmethane dyes and Lake pigments thereof (examples of laking agents include phosphotungstic acid, phosphomolybdic acid, phosphotungstic-molybdic acid, tannic acid, lauric acid, gallic acid, ferricyanic acid and ferrocyanic compounds); metal salts of higher fatty acids; and resin-based charge control agents. A single one of these charge control agents may be incorporated or a combination of two or more may be incorporated. The amount of charge control agent addition is preferably from 0.01 to 10.0 parts by mass per 100 parts by mass of the binder resin or the polymerizable monomers to produce binder resin.

A method of producing toner particles will be explained hereinbelow. As a method for producing the toner particles, a known means can be used, and a wet production method such as a suspension polymerization method, an emulsion polymerization and aggregation method, or an emulsion and aggregation method, or a kneading and pulverizing method can be used. The toner particles are preferably toner particles obtained by a wet production method, and more preferably toner particles obtained by a suspension polymerization method.

In the suspension polymerization method, toner particles are produced through a granulation step of dispersing a polymerizable monomer composition including a polymerizable monomer capable of producing a binder resin, a monohydric aliphatic alcohol, and optionally an additive such as a colorant and a wax in an aqueous medium to form droplet particles of the polymerizable monomer composition, and a polymerization step of producing toner particles by polymerizing the polymerizable monomer in the droplet particles. Preferred examples of the polymerizable monomer include vinyl-based polymerizable monomers. Specifically, the following can be exemplified.

Examples of the monofunctional monomer include styrene; styrene derivatives such as α-methylstyrene, β-methylstyrene, o-methylstyrene, m-methylstyrene, p-methylstyrene, 2,4-dimethylstyrene, and the like; acrylic polymerizable monomers such as methyl acrylate, ethyl acrylate, n-propyl acrylate, iso-propyl acrylate, n-butyl acrylate, iso-butyl acrylate, tert-butyl acrylate, 2-ethylhexyl acrylate, and the like; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, and the like; Methylene aliphatic monocarboxylic acid esters; vinyl esters such as vinyl acetate, vinyl propionate, vinyl benzoate, vinyl butyrate, and vinyl formate.

The binder resin is preferably a styrene acrylic resin. That is, the binder resin is preferably a polymer of styrene and at least one selected from the group consisting of an acryl-based polymerizable monomer and a methacryl-based polymerizable monomer.

In the emulsion and aggregation method, an aqueous dispersion liquid of fine particles composed of constituent materials of toner particles, which are sufficiently small with respect to the target particle diameter, is prepared in advance, the fine particles are aggregated in an aqueous medium until the toner particle diameter is reached, and the resin is fused by heating to produce a toner.

Preferably, the emulsion and aggregation method includes a dispersion step of preparing each fine particle dispersion liquid including a constituent material of the toner particles, an aggregation step of aggregating the fine particles including the constituent materials of the toner particles, and controlling the particle diameter until the particle diameter of the toner particles is reached to obtain aggregated particles, and a fusion step of fusing the resin contained in the obtained aggregated particles. Further, if necessary, a subsequent cooling step, a filtration/washing step of separating the obtained toner particles and washing them with ion-exchanged water, and a step of removing the moisture of the washed toner particles and drying may be included.

Hereinafter, a method for producing toner particles by a pulverization method will be explained in detail by way of an example. In a raw material mixing step, a binder resin, monohydric aliphatic alcohol, and if necessary, a colorant, wax, and other additives are weighed in predetermined amounts, compounded, and mixed as materials constituting the toner particles. Examples of the mixing device include a double-cone mixer, a V-type mixer, a drum-type mixer, a Super mixer, an FM mixer, a Nauta mixer, MechanoHybrid (manufactured by Nippon Coke & Engineering, Ltd.), and the like.

Next, the mixed materials are melt-kneaded to disperse the colorant and wax the like in the binder resin. In the melt-kneading step, a batch-type kneader such as a pressure kneader or a Banbury mixer, or a continuous kneader can be used. Single-screw or twin-screw extruders are mainly used because of their superiority in continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp.), a twin-screw extruder (manufactured by KCK Engineering Co.), a co-kneader (manufactured by Buss AG), Kneadex (manufactured by Nippon Coke & Engineering Co., Ltd.), and the like. Further, the kneaded product obtained by melt-kneading may be rolled with two rolls or the like and cooled with water or the like in a cooling step.

Then, the cooled product of the kneaded product can be pulverized to a desired particle diameter in the pulverization step. In the pulverization step, after coarse pulverization with a pulverizer such as a crusher, a hammer mill, or a feather mill, fine pulverization is further performed, for example, with Cryptron System (manufactured by Kawasaki Heavy Industries, Ltd.), Super Rotor (manufactured by Nisshin Engineering Co., Ltd.), a turbo mill (manufactured by Freund-Turbo Corporation), or a fine pulverizer based on an air jet method.

After that, if necessary, classification is performed with a classifier or a sieving machine such as Elbow Jet of an inertial classification system (manufactured by Nittetsu Mining Co., Ltd.), Turboplex of a centrifugal force classification system (manufactured by Hosokawa Micron Corporation), a TSP separator (manufactured by Hosokawa Micron Corporation), and Faculty (manufactured by Hosokawa Micron Corporation) to obtain toner particles.

Further, the toner particles may be spheroidized. For example, after pulverizing, spheroidization may be performed using a hybridization system (manufactured by Nara Machinery Co., Ltd.), a Mechanofusion system (manufactured by Hosokawa Micron Corporation), Faculty (manufactured by Hosokawa Micron Corporation), and Meteorainbow MR Type (manufactured by Nippon Pneumatic Mfg. Co., Ltd.). From the viewpoint of low-temperature fixability, the glass transition temperature (Tg) of the toner particles is preferably from 40 to 60° C.

The toner can be obtained by externally adding at least one selected from the group consisting of hydrotalcite particles and alumina particles, and if necessary, the external additive C to the obtained toner particles and mixing. The external addition and mixing may be performed by a known means using a Henschel mixer or the like.

The toner particle preferably comprises a core-shell structure comprising a core particle and a shell on the surface of the core particle. When the toner particle comprises a core-shell structure, the durability and charging performance of the toner can be improved. The shell does not necessarily have to cover the entire core particle, and there may be a portion where the core particle is exposed.

The resin that forms the shell of the toner particles preferably mainly comprises a resin such as a polyester resin, a styrene acrylic resin, and the like, and more preferably a polyester resin. Since the polyester resin is easily compatible with alcohols, where the shell has the polyester resin, the monohydric aliphatic alcohol efficiently concentrates near the toner particle surface, and the effect can be easily obtained by adding a small amount of alcohol.

In cross-sectional observation of the toner with a transmission electron microscope, it is preferable that the shell be present inside the contour of the cross section of the toner particle, and that the shell comprise a polyester resin. The thickness of the shell is preferably 0.8 to 100 nm, and more preferably 1 to 30 nm.

Where the thickness of the shell is 0.8 nm or more, durability is likely to improve. In addition, the polyester resin makes it easier for the monohydric aliphatic alcohol to concentrate near the toner particle surface. Where the thickness of the shell is 100 nm or less, the fixing performance is improved. In addition, the alcohol is suitably concentrated near the toner particle surface and it becomes easier to suppress fusion during long-term use. A method for measuring the thickness of the shell will be described hereinbelow.

A polyhydric alcohol (dihydric, trihydric or higher alcohol), a polyvalent carboxylic acid (divalent, trivalent or higher carboxylic acid), and an acid anhydride thereof or a lower alkyl ester thereof can be used as the monomers to be used in the polyester resin.

The following polyhydric alcohol monomers can be used as the polyhydric alcohol monomer used for the polyester resin.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and bisphenols represented by a formula (A) and derivatives thereof; and diols represented by a formula (B).

(A)

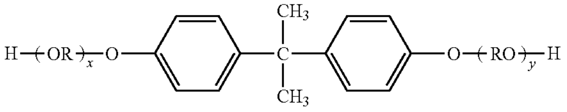

(In the formula (A), R represents an ethylene group or a propylene group, x and y are each an integer of 0 or more, and the average value of x+y is from 0 to 10.)

(B)

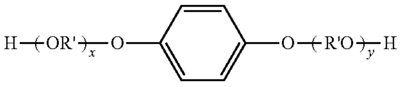

(In the formula (B), R' represents $—CH_2CH_2—$, $—CH_2CH(CH_3)—$ or $—CH_2C(CH_3)_2—$, x and y are integers of 0 or more, respectively, and the average value of x+y is 0 or more and 10 or less.)

Examples of trihydric or higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentantriol, glycerol, 2-methylpropanetriol, 2-methyl-1,2,4-butanetriol, trimethylolethane, trimethylolpropane, and 1,3,5-trihydroxymethylbenzene.

Of these, glycerol, trimethylolpropane, and pentaerythritol are preferably used. These divalent alcohols and trihydric or higher alcohols can be used alone or in combination of two or more.

As the polyvalent carboxylic acid monomer to be used for the polyester resin, the following polyvalent carboxylic acid monomers can be used.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, anhydrides of these acids and lower alkyl esters thereof.

Of these, maleic acid, fumaric acid, terephthalic acid, and n-dodecenyl succinic acid are preferably used.

Examples of trivalent or higher carboxylic acids, acid anhydrides thereof or lower alkyl esters thereof include 1,2,4-benzenetricarboxylic acid, 2,5,7-naphthalentricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof or lower alkyl esters thereof.

Of these, 1,2,4-benzenetricarboxylic acid, that is, trimellitic acid or a derivative thereof, is preferably used because such acid is inexpensive and reaction control thereof is easy.

These divalent carboxylic acids and the like and trivalent or higher carboxylic acids can be used alone or in combination of two or more.

A method for producing the polyester resin is not particularly limited, and a known method can be used. For example, the above-mentioned alcohol monomer and carboxylic acid monomer are simultaneously charged and polymerized through an esterification reaction or a transesterification reaction and a condensation reaction to produce a polyester resin.

As the styrene acrylic resin used for the shell, the above-mentioned vinyl-based polymerizable monomer can be used. In addition, it is preferable to use a monomer having a polar group such as acrylic acid, methacrylic acid, 2-hydroxyethyl acrylate, 2-hydroxyethyl methacrylate, and 2-hydroxypropyl methacrylate. The styrene acrylic resin used for the shell is preferably a polymer of at least one selected from the group consisting of acrylic polymerizable monomers and methacrylic polymerizable monomers, at least one selected from the group consisting of monomers having a polar group, and styrene.

In order to improve the performance of the toner, it is preferable that the external additive include an external additive C different from the hydrotalcite particles and alumina particles.

The external additive C is, for example, fluorine-based resin particles such as vinylidene fluoride fine particles and polytetrafluoroethylene fine powder; silica fine particles such as wet silica or dry silica, titanium oxide fine particles, and alumina fine particles; hydrophobized fine particles obtained by subjecting the aforementioned fine particles to surface treatment with a hydrophobizing agent such as a silane compound, a titanium coupling agent, silicone oil, and the like; oxides such as zinc oxide and tin oxide; complex oxides such as strontium titanate, barium titanate, calcium titanate, strontium zirconate, and calcium zirconate; carbonate compounds such as calcium carbonate and magnesium carbonate; and the like.

The external additive C is preferably silica fine particles, and the so-called dry silica or dry silica fine particles called fumed silica, which are fine particles obtained by vapor-phase oxidation of a silicon halogen compound are preferred.

The dry production method utilizes, for example, a pyrolysis oxidation reaction of silicon tetrachloride gas in oxyhydrogen flame, and the basic reaction formula is as follows.

$$SiCl_4+2H_2+O_2 \rightarrow SiO_2+4HCl$$

In this production process, it is also possible to obtain composite fine particles of silica and another metal oxide by using a silicon halogen compound together with another metal halogen compound such as aluminum chloride or titanium chloride, and silica fine particles are also inclusive of such composite fine particles.

It is preferable that the external additive C have a number average particle diameter of from 3 to 200 nm because high charging performance and flowability can be ensured. The number average particle diameter of primary particles of the external additive C is more preferably from 5 to 20 nm. The amount of the external additive C is preferably from 0.01 to 3.0 parts by mass, and more preferably from 0.5 to 2.0 parts by mass with respect to 100 parts by mass of the toner particle. When the amount of the external additive C is in the above range, it is possible to improve the fixing performance while maintaining good flowability. Further, the external additive C is preferably surface-treated with a hydrophobizing agent. By surface-treating the external additive C, it becomes easy to obtain a good image regardless of the usage environment.

Methods for measuring various physical properties will be explained hereinbelow.

Identification and Quantification of Monohydric Aliphatic Alcohol in Toner Preparation of Extraction Sample A total of 2 g of toner and 18 g of ethanol are added, homogenized by hand, and then irradiated with ultrasonic waves for 5 min. Then, the mixture is allowed to stand in a thermostat at 60° C. for a whole day and night, and further allowed to stand at room temperature for 3 days. The supernatant of the sample is then collected and filtered through a PTFE syringe filter (pore size 250 nm), and the filtrate is used as an extraction sample.

GC/MS Analysis

The GC/MS device is GC TRACE-1310 (manufactured by Thermo Fisher Scientific Corp.), the detector is a single quadrupole analyzer MS ISQ LT (manufactured by Thermo Fisher Scientific Corp.), and the autosampler is TRIPLUS RSH (manufactured by Thermo Fisher Scientific Corp.). The measurement is performed under the conditions shown below.

Sample amount: 1 μL (liquid spraying)
Column: HP5-MS (manufactured by Agilent Technologies, Inc.)
Length: 30 m, inner diameter 0.25 mm, film thickness 0.25 μm
Split ratio: 10
Split flow: 15 mL/min
Injection port temperature: 250° C.
Flow rate of helium gas in the column: 1.5 mL/min
MS ionization: EI Column temperature condition: held at 40° C. for 3 min, then raised to 300° C. at 10°./min and held for 10 min.

Ion source temperature: 250° C.

Mass Range: m/z 45-1000

Transport line temperature: 250° C.

Creation of Calibration Curve

Samples for preparing a calibration curve are prepared so that the concentration of monohydric aliphatic alcohol (based on mass) in an ethanol solution is 10 ppm, 50 ppm, 100 ppm, and 250 ppm. These samples are measured under the above conditions, and a calibration curve is created from the area value of the peak derived from the monohydric aliphatic alcohol. Using the obtained calibration curve, the extraction sample is analyzed, and the content ratio of monohydric aliphatic alcohol in the toner extracted with ethanol is calculated.

For the structure of monohydric aliphatic alcohol, the above-mentioned extraction sample is analyzed and the structure thereof is determined using a FT NMR device JNM-EX400 (manufactured by JEOL Ltd.) [$^1$H-NMR 400 MHz, $CDCl_3$, room temperature (25° C.)] ($^{13}$C-NMR etc. are also used).

Measurement of Work Function of Toner Particle and External Additive

The work functions of toner particle and external additive are measured by the following measurement method. The work function is quantified as energy (eV) for extracting an electron from the substance. The work function is measured using a surface analyzer (AC-2 manufactured by Riken Keiki Co., Ltd.). In this device, a deuterium lamp is used and measurement is performed under the following conditions.

Irradiation light quantity: 800 nW

Spectrometer: monochromatic light

Spot size: 4 [mm]×4 [mm]

Energy scanning range: 3.6 to 6.2 [eV]

Anode voltage: 2910 V

Measurement time: 30 [sec/1 point]

Then, photoelectrons emitted from the sample surface are detected, and the work function calculation software built into the surface analyzer is used for arithmetic processing. The work function is measured with a repeatability (standard deviation) of 0.02 [eV]. When measuring a powder, a cell for measuring a powder is used.

In the surface analysis, where the excitation energy of monochromatic light is scanned from low to high at 0.05 eV intervals, photon emission starts from a certain energy value [eV], and this energy threshold value is taken as a work function [eV].

The FIGURE shows an example of a measurement curve of the work function obtained by the measurement under the above conditions. In the FIGURE, the horizontal axis represents the excitation energy [eV], and the vertical axis represents the value Y of the number of emitted photons to the power of 0.5 (normalized photon yield). In general, when the excitation energy value exceeds a certain threshold, the emission of photons, that is, the normalized photon yield, increases rapidly, and the work function measurement curve rises rapidly. The rising point is defined as a photoelectric work function value [Wf]. This photoelectric work function value [Wf] is taken as the work function of the sample.

In the measurement of the work function, the sample uses toner particles, hydrotalcite particles, alumina particles, or external additive C.

Regarding the toner particles, the toner particles obtained by removing the external additive from the toner by the following method may be used as a sample.

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube to prepare a dispersion liquid. To this dispersion liquid, 1 g of toner is added, and toner lumps are loosened with a spatula or the like.

The centrifuge tube is set in "KM Shaker" (model: V. SX, manufactured by Iwaki Sangyo Co., Ltd.) and shaken for 20 min under the condition of 350 reciprocations per min. After shaking, the solution is transferred to a glass tube (50 mL) for a swing rotor, and centrifugation is performed under the conditions of 3500 rpm and 30 min with a centrifuge. In the glass tube after centrifugation, toner particles are present in the uppermost layer, and the external additive is present on the aqueous solution side of the lower layer. Toner particles of the top layer are separated. If necessary, shaking and centrifugation may be repeated to perform sufficient separation.

Where the hydrotalcite particles or alumina particles and the external additive C are available independently, the hydrotalcite particles or alumina particles and the external additive C can be measured independently. When these are not available alone, the toner is dispersed in a solvent such as chloroform or the like, and then the hydrotalcite particles, alumina particles, and external additive C are separated by centrifugation or the like based on a difference in specific gravity. The method is as follows.

First, 1 g of toner is added to 31 g of chloroform in a vial and dispersed to separate hydrotalcite particles, alumina particles, and external additive C from the toner. For dispersion, an ultrasonic homogenizer is used for 30 min to prepare a dispersion liquid. The processing conditions are as follows.

Ultrasonic processing device: ultrasonic homogenizer VP-050 (manufactured by TIETECH Co., Ltd.)

Microchip: step type microchip, tip diameter φ2 mm

Microchip tip position: central part of glass vial and at a height of 5 mm from the vial bottom Ultrasonic conditions: intensity 30%, 30 min. At this time, ultrasonic waves are applied while cooling the vial with ice water so that the temperature of the dispersion liquid does not rise.

The dispersion liquid is transferred to a glass tube (50 mL) for a swing rotor, and centrifuged under the conditions of 58.33 $S^{-1}$ for 30 min with a centrifuge (H-9R; manufactured by Kokusan Co., Ltd.). In the glass tube after centrifugation, the fraction containing mainly hydrotalcite particles or alumina particles and the external additive C can be separated by the specific gravity. Where the separation is not successful, the speed and time of centrifugation are adjusted. The obtained fraction is dried under vacuum conditions (40° C./24 h) to obtain a sample.

Method for Measuring Weight-Average Particle Diameter (D4) of Toner

The weight-average particle diameter (D4) of the toner is calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3

Version 3.51 produced by Beckman Coulter, Inc.) for setting measurement conditions and analysis of measured data are used for measurement. The measurements are carried out using 25,000 effective measurement channels, and then measurement data is analyzed and calculated. A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis. On the "Standard Operating Method (SOM) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 μm. The specific measurement method is as follows.

1. 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

2. Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

3. An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 180° is prepared. A predetermined amount of ion exchanged water is placed in a water bath in the ultrasonic dispersion system, and approximately 2 mL of Contaminon N is added to this water bath.

4. The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

5. While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

6. The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

7. The weight-average particle diameter (D4) is calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (D4).

Method for Measuring Average Circularity of Toner

The average circularity of the toner is measured with an "FPIA-3000" flow particle image analyzer (Sysmex Corporation) under the measurement and analysis conditions for calibration operations. The specific measurement methods are as follows.

20 mL of ion-exchange water from which solid impurities and the like have been removed is first placed in a glass container. 0.2 mL of a dilute solution of "Contaminon N" (a 10 mass % aqueous solution of a pH 7 neutral detergent for washing precision instruments, comprising a nonionic surfactant, an anionic surfactant and an organic builder, manufactured by Wako Pure Chemical Industries, Ltd.) diluted three times by mass with ion-exchange water is then added as a dispersant. 0.02 g of the measurement sample is then added and dispersed for 2 minutes with an ultrasonic disperser to obtain a dispersion for measurement. Cooling is performed as appropriate during this process so that the temperature of the dispersion is 10 to 40° C.

Using a tabletop ultrasonic cleaner and disperser having an oscillating frequency of 50 kHz and an electrical output of 150 W (for example, "VS-150" manufactured by Velvo-Clear) as an ultrasonic disperser, a predetermined amount of ion-exchange water is placed on the water tank, and 2 mL of the Contaminon N is added to the tank. For the measurement, a flow type particle image analyzer equipped with "UPlanApro" (magnification 10 times, numerical aperture 0.40) as an objective lens is used, and a particle sheath "PSE-900A" (manufactured by Sysmex Corporation) is used as a sheath liquid.

The liquid dispersion obtained by the procedures above is introduced into the flow particle image analyzer, and 3,000 toner particles are measured in HPF measurement mode, total count mode. The average circularity of the toner is then determined with a binarization threshold of 85% during particle analysis, and with the analyzed particle diameters limited to equivalent circle diameters of from 1.985 to less than 39.69 μm.

Prior to the start of measurement, autofocus adjustment is performed using standard latex particles (for example, Duke Scientific Corporation "RESEARCH AND TEST PARTICLES Latex Microsphere Suspensions 5100A" diluted with ion-exchange water). Autofocus adjustment is then performed again every two hours after the start of measurement.

In the examples in the present application, the flow particle image analyzer used had been calibrated by the Sysmex Corporation and had been issued a calibration certificate by the Sysmex Corporation. The measurements were carried out under the same measurement and analysis conditions as when the calibration certification was received, with the exception that the analyzed particle diameter was limited to a circle-equivalent diameter of from 1.985 to 39.69 μm.

Measurement of Styrene Acrylic Resin Ratio in Toner

For the analysis of the content ratio of resin, a pyrolysis gas chromatography mass spectrometer (hereinafter, pyrolysis GC/MS) and NMR are used. In the present disclosure, a component having a molecular weight of 1500 or more is taken as a measurement object. This is because the region with a molecular weight of less than 1500 is considered to be a region in which the proportion of wax is high and the resin component is substantially not contained.

In pyrolysis GC/MS, it is possible to determine constituent monomers of total resin in the toner and obtain the peak area of each monomer, but in order to perform quantification, it is necessary to standardize the peak intensity using a sample with a known concentration as a reference. Meanwhile, in NMR, it is possible to determine and quantify constituent monomers without using a sample having a known concentration. Therefore, depending on the situation, the constituent monomers are identified while comparing the spectra of both NMR and pyrolysis GC/MS.

Specifically, when the amount of the resin component insoluble in deuterated chloroform, which is the extraction solvent at the time of NMR measurement, is less than 5.0% by mass, quantification is performed by NMR measurement. Meanwhile, when a resin component insoluble in deuterated chloroform, which is an extraction solvent at the time of NMR measurement, is present in an amount of 5.0% by mass or more, both NMR measurement and pyrolysis GC/MS measurement are performed on the deuterated chloroform-soluble component, and pyrolysis GC/MS measurement is performed on the deuterated chloroform-insoluble component.

In this case, first, NMR measurement of the deuterated chloroform-soluble component is performed, and the constituent monomers are determined and quantified (quantification result 1). Next, pyrolysis GC/MS measurement is performed on the deuterated chloroform-soluble component, and the peak area of the peak attributed to each constituent monomer is determined. Using the quantitative result 1 obtained by NMR measurement, the relationship between the amount of each constituent monomer and the peak area of pyrolysis GC/MS is determined.

Next, pyrolysis GC/MS measurement of the deuterated chloroform-insoluble component is performed, and the peak area of the peak attributed to each constituent monomer is determined. Based on the relationship between the amount of each constituent monomer obtained by measuring the deuterated chloroform-soluble component and the peak area of pyrolysis GC/MS, the constituent monomers in the deuterated chloroform-insoluble component are quantified (quantification results 2). Then, the quantification result 1 and the quantification result 2 are combined to obtain the final quantification result of each constituent monomer.

Specifically, the following operations are performed.

(1) A total of 500 mg of toner is weighed into a 30 mL glass sample bottle, 10 mL of deuterated chloroform is added, the bottle is covered, and dispersion and dissolution are performed with an ultrasonic disperser for 1 h. Then, filtration is performed with a membrane filter having a diameter of 0.4 μm, and the filtrate is collected. At this time, the deuterated chloroform-insoluble component remains on the membrane filter.

(2) Using high-performance liquid chromatography (HPLC), components having a molecular weight of less than 1500 are removed from 3 mL of the filtrate with a fraction collector, and a resin solution is collected. Chloroform is removed from the collected solution using a rotary evaporator to obtain a resin. The components with a molecular weight less than 1500 are determined by measuring a polystyrene resin having a known molecular weight in advance and obtaining the elution time.

(3) A total of 20 mg of the obtained resin is dissolved in 1 mL of deuterated chloroform, 1H-NMR measurement is performed, a spectrum is attributed to each constituent unit used for the polyester resin, and a quantitative value is obtained.

(4) If the deuterated chloroform-insoluble component needs to be analyzed, analysis is performed by pyrolysis GC/MS. If necessary, derivatization treatment such as methylation is performed.

NMR Measurement Conditions

- Device: FT NMR device JNM-EX400 (manufactured by JEOL Ltd.)
- Measurement frequency: 400 MHz
- Pulse condition: 5.0 μs
- Frequency range: 10,500 Hz
- Number of integrations: 1024 times
- Measurement temperature: 25° C.
- Sample: prepared by placing 50 mg of the measurement sample in a sample tube having an inner diameter of 5 mm, adding deuterated chloroform ($CDCl_3$) as a solvent, and dissolving in a thermostat at 40° C.

The mol ratio of each monomer component is obtained from the integrated value of the obtained spectrum, and the composition ratio (mass %) is calculated based on this.

Measurement Conditions for Pyrolysis GC/MS

- Pyrolysis device: JPS-700 (Japan Analytical Industry Co., Ltd.)
- Decomposition temperature: 590° C.
- GC/MS device: Focus GC/ISQ (Thermo Fisher Scientific Corp.)
- Column: HP-5MS, length 60 m, inner diameter 0.25 mm, film thickness 0.25 μm
- Injection port temperature: 200° C.
- Flow pressure: 100 kPa
- Split: 50 mL/min
- MS ionization: EI
- Ion source temperature: 200° C.
- Mass Range: 45-650

Identification of Shell Resin Species of Toner Particles

The resin type of the toner particle shell is analyzed using time-of-flight secondary ion mass spectrometry (TOF-SIMS). For the measurement of the amount of polyester on the toner particle surface, for example, when the polyester resin has a structure derived from phthalic acid, isophthalic acid or terephthalic acid, TRIFT-IV manufactured by ULVAC-PHI, Inc. can be used. The analysis conditions are as follows.

Sample preparation: the toner is attached to an indium sheet. The toner particles obtained by separating the external additive from the toner may be used as a sample.

- Sample pretreatment: none
- Primary ion: $Au^+$
- Acceleration voltage: 30 kV
- Charge neutralization mode: On
- Measurement mode: positive
- Raster: 100 μm
- Calculation of peak intensity (EI) derived from phthalic acid, isophthalic acid or terephthalic acid including an ester group: according to ULVAC-PHI standard software (WinCadence), the total count peak number with mass numbers 148 to 150 is taken as the peak intensity (EI).

Calculation of peak intensity derived from other resins: according to ULVAC-PHI standard software (WinCadence), the total count peak number with mass numbers 90 to 105 is taken as the peak intensity derived from other resins.

The total value of this peak intensity and the peak intensity (EI) derived from phthalic acid, isophthalic acid or terephthalic acid containing an ester group is taken as the peak intensity (ZI) derived from the resin on the toner particle surface. EI/ZI is calculated from the peak intensity. For example, when EI/ZI≥0.5, it is determined that the polyester resin is present on the surface of the toner particle. The mass number in the measurement of peak intensity (EI) can be changed according to the constituent monomers of the polyester resin used.

Measurement of Shell Thickness

The thickness of the shell is measured with a transmission electron microscope. The cross section of the toner observed with a transmission electron microscope is prepared as follows.

First, the toner is sprayed on cover glass (Matsunami Glass Co., Ltd., angular cover glass, Square No. 1) so as to form a single layer, and an Os film (5 nm) and a naphthalene film (20 nm) are applied as protective films by using an osmium plasma coater (Filgen Co., Ltd., OPC80T). Next, a PTFE tube (Φ1.5 mm×Φ3 mm×3 mm) is filled with a photocurable resin D800 (JEOL Ltd.), and the cover glass is gently placed on the tube with the orientation such that the toner comes into contact with the photocurable resin D800. After curing the resin by light irradiation in this state, the cover glass and the tube are removed to form a cylindrical resin in which toner is embedded in the outermost surface.

A layer with a thickness equal to the half of the toner particle diameter (4.0 μm when the weight average particle diameter (D4) is 8.0 μm) is cut from the outermost surface of the cylindrical resin at a cutting speed of 0.6 mm/s by an ultrasonic ultramicrotome (Leica Biosystems Nussloch GmbH, UC7) to expose a cross section of the toner particles. Next, the magnetic toner is cut to a film thickness of 100 nm to prepare a flaky sample of toner particle cross section. By cutting by such a method, a cross section of the central portion of the toner particle can be obtained.

Using a transmission electron microscope (TEM) (JEM2800 manufactured by JEOL Ltd.), a TEM image of toner is prepared under the condition of an acceleration voltage of 200 kV. The image is acquired with a TEM probe size of 1 nm and an image size of 1024×1024 pixels. In the obtained TEM image, the binder resin contained in the core particle and the shell are observed as different contrasts.

The difference in light and darkness differs depending on the material, but in the present disclosure, the part observed as differing in contrast from the binder resin contained in the core particles is referred to as a shell. In the toner under observation, 10 particles with a diameter within ±1.0 μm from the weight average particle diameter (D4) are selected and images thereof are captured. The observation magnification is 20,000 times.

For thickness measurement, commercially available image analysis software, WinROOF (manufactured by Mitani Corporation) is used. In TEM images of 10 toner particles randomly selected according to the above criteria, the thickness of the shell is measured at 4 points for each particle. Specifically, two perpendicular straight lines are drawn through substantially the center of the toner cross section, and the thickness of the shell is measured at four points where the two lines intersect the shell. The thickness of the shell is the distance from the contour of the cross section of the toner particle to the interface between the binder resin and the shell. The arithmetic mean value of all measured values is taken as the thickness of the toner particle shell.

Method for Measuring Number Average Value of Major Axes of Hydrotalcite Particles or Alumina Particles and Number Average Particle Diameter of Primary Particles of External Additive C The location of the hydrotalcite particles and alumina particles and also the external additive C such as silica particles that are present on the toner surface can be specified by observation with an ultra-high resolution field emission scanning electron microscope S-4800 (Hitachi High Technologies Co., Ltd.) (SEM-EDX) and by elemental analysis. For example, where observation and element mapping are performed in a continuous field of view at a magnification of 20,000 times and the presence of both Mg and Al elements could be confirmed in the particle under observation, it can be determined that this is a hydrotalcite particle. Similarly, where the presence of Al could be confirmed in the particle under observation, it can be determined that this is an alumina particle, and where the presence of Si could be confirmed, it can be determined that this is a silica particle.

A method for measuring the number average value of major axes of hydrotalcite particles will be described hereinbelow. The major axis is measured for at least 300 hydrotalcite particles on the toner surface and the average is calculated. Some hydrotalcite particles are present as aggregated particles, but such aggregated particles are not subject to particle diameter measurement. Further, the maximum diameter of the particles is treated as the major axis. Further, the average of major axes of alumina particles is measured and calculated in the same manner as the average of major axes of hydrotalcite particles. Where the external additive C is silica particles, the number average particle diameter of the primary particles is calculated by counting the absolute maximum length thereof as a particle diameter when the particle has a spherical shape and counting the major axis as a particle diameter when the particle has a major axis and a minor axis.

Method for Measuring the Amount of Hydrotalcite Particles, Alumina Particles, and External Additive C The amount of hydrotalcite particles, alumina particles, and external additive C is obtained by calculation from the intensity of elements from the hydrotalcite particles, alumina particles, and external additive C in the toner measured by a fluorescent X-ray analyzer (XRF). For example, using a calibration curve method, the amount of hydrotalcite particles can be analyzed and calculated from the intensity of Al and Mg elements. Further, the amount of alumina particles can be analyzed and calculated from the intensity of Al element. Where the external additive C is a silica particle, the amount can be analyzed and calculated from the intensity of Si element.

As the measuring device, a wavelength dispersive fluorescent X-ray analyzer "Axios" (manufactured by PANalytical) equipped with dedicated software "SuperQ ver. 4.0F" (manufactured by PANalytical) for setting measurement conditions and analyzing measurement data is used. Rh is used as the anode of an X-ray tube, the measurement atmosphere is vacuum, the measurement diameter (collimator mask diameter) is 10 mm, and the measurement time is 10 sec. Further, when measuring a light element, a proportional counter (PC) is used for detection, and when measuring a heavy element, a scintillation counter (SC) is used for detection. The measurement is performed under the above conditions, the element is identified based on the obtained peak position of X-rays, and the concentration thereof is calculated from the count rate (unit:cps) which is the number of X-ray photons per unit time.

A pellet prepared by placing about 1 g of toner in a dedicated aluminum ring for pressing, flattening, pressurizing for 60 sec under 20 MPa and molding to a thickness of about 2 mm by using a tablet molding compressor "BRE-32" (manufactured by Maekawa Testing Machine Mfg. Co., Ltd.) is used as a measurement sample. The amount is calculated from the obtained peak intensity on the basis of the calibration curve plotted in advance from the samples with a known amount.

EXAMPLES

The present invention will be described in more detail hereinbelow with reference to Examples and Comparative Examples, but the present invention is not limited thereto. Unless otherwise specified, the parts used in the examples are based on mass.

Production Example of External Additive B1

A total of 203.3 g of magnesium chloride hexahydrate and 96.6 g of aluminum chloride hexahydrate were dissolved in 1 L of deionized water, and while keeping this solution at 25° C., pH thereof was adjusted to 10.5 with a solution obtained by dissolving 60 g of sodium hydroxide in 1 L of ionized water. Then, aging was performed at 98° C. for 24 h. After cooling, the precipitate was washed with deionized water until the conductivity of the filtrate became 100 μS/cm or less to obtain a slurry having a concentration of 5% by mass. While stirring this slurry, the external additive B1 was obtained by spray drying with a spray dryer (DL-41, manufactured by Yamato Scientific Co., Ltd.) at a drying temperature of 180° C., a spray pressure of 0.16 MPa, and a spray rate of about 150 mL/min. The physical characteristics are shown in Table 1.

TABLE 1

| External additive | | Particle diameter | Surface | Work function |
|---|---|---|---|---|
| No. | Types | (nm) | treatment agent | (eV) |
| B1 | Hydrotalcite | 450 | — | 5.15 |
| B2 | Hydrotalcite | 500 | — | 5.15 |
| B3 | Hydrotalcite | 450 | — | 4.97 |
| B4 | Hydrotalcite | 70 | — | 5.15 |
| B5 | Hydrotalcite | 50 | — | 5.15 |
| B6 | Hydrotalcite | 800 | — | 5.15 |
| B7 | Hydrotalcite | 860 | — | 5.15 |
| B8 | Hydrotalcite | 200 | — | 5.35 |
| B9 | Hydrotalcite | 450 | — | 5.43 |
| B10 | Hydrotalcite | 450 | — | 4.90 |
| B11 | Alumina | 400 | — | 5.27 |
| B12 | Silica | 7 | PDMS | 5.63 |
| B13 | Silica | 7 | Amino-modified silicon oil | 5.30 |
| B14 | Titania | 400 | Isobutyltrimethoxysilane | 5.15 |

The particle diameter is the number average value of major axes (for silica, the number average particle diameter of primary particles). The abbreviations in the table are as follows.

PDMS: Polydimethylsiloxane

Production Examples of External Additives B2 to B10

External additives B2 to B10 were obtained in the same manner as in the production of the external additive B1, except that the addition amounts of magnesium chloride hexahydrate and aluminum chloride hexahydrate and the spray pressure and the spray rate of the spray dryer were adjusted. The physical characteristics are shown in Table 1.

Production Example of External Additive B11

A test was conducted by using alumina hydroxide as an alumina raw material, adding 0.02 parts of α-alumina as a seed crystal (the amount added is for 100 parts of the alumina amount obtained from the alumina raw material; the same applies hereinafter), and introducing hydrogen chloride gas as the atmospheric gas into a tubular furnace. The introduction temperature of the atmospheric gas was 900° C., the holding temperature (firing temperature) was 1200° C., and the holding time (firing time) was 30 min. The physical characteristics of the external additive B11 are shown in Table 1.

Production Example of External Additive B12

A total of 10.0 parts of polydimethylsiloxane was sprayed on 100 parts of fumed silica (trade name: AEROSIL 380S, specific surface area by BET method: 380 $m^2/g$, average particle diameter of primary particles: 7 nm, manufactured by Nippon Aerosil Co., Ltd.), followed by stirring for 30 min. Then, the temperature was raised to 300° C. with stirring, and stirring was further performed for 2 h to prepare an external additive B12. The physical characteristics are shown in Table 1.

Production Example of External Additive B13

An external additive B13 was produced by the same method as the external additive B12, except that polydimethylsiloxane was replaced with amino-modified silicone oil. The physical characteristics are shown in Table 1.

Production Example of External Additive B14

Anatase-type titanium oxide was treated with 12% by mass of isobutyltrimethoxysilane to obtain an external additive B14. The physical characteristics are shown in Table 1.

Production Example of Shell Resin 1

A total of 40 mol % of terephthalic acid, 10 mol % of trimellitic acid, and 50 mol % of bisphenol A-propylene oxide (PO) 2 mol adduct were placed in a reaction vessel equipped with a nitrogen introduction tube, a dehydration tube, a stirrer and a thermocouple, and dibutyltin oxide was added as a catalyst at 1.5 parts per 100 parts of the total amount of the monomers. Then, the temperature was rapidly raised to 180° C. under normal pressure and under a nitrogen atmosphere, and then water was distilled off while heating at a rate of 10° C./h from 180° C. to 210° C. to carry out polycondensation. After reaching 210° C., the pressure inside the reaction vessel was reduced to 5 kPa or less, and polycondensation was performed under the conditions of 210° C. and 5 kPa or less to obtain a shell resin 1. At that time, the polymerization time was adjusted so that the softening point of the obtained shell resin 1 was 120° C.

Production Example of Shell Resin 2

A total of 300 parts of xylene (boiling point 144° C.) was charged into a flask that could be pressurized and depressurized, the inside of the container was sufficiently purged with nitrogen under stirring, the temperature was then raised, and refluxing was performed. A mixed solution of the following raw materials was added.

Styrene: 91.7 parts
Methyl methacrylate: 2.50 parts
Methacrylic acid: 3.30 parts
2-Hydroxyethyl methacrylate: 2.50 parts
Di-tert-butyl peroxide: 2.00 parts Polymerization was carried out for 5 h at a polymerization temperature of 175° C. and a reaction pressure of 0.125 MPa. Then, the solvent removal step was carried out under reduced pressure for 3 h to remove xylene, and pulverization was performed to obtain a shell resin 2 (acid value=10.9, molecular weight (Mp)=14,500).

Production Example of Toner Particles A1

A total of 390.0 parts of ion-exchanged water and 14.0 parts of sodium phosphate (12-hydrate) [manufactured by Rasa Industries., Ltd.] were put into a reaction vessel, and the components were kept warm at 65° C. for 1.0 h while purging with nitrogen. Next, a calcium chloride aqueous solution prepared by dissolving 9.2 parts of calcium chloride (dihydrate) in 10.0 parts of ion-exchanged water was batch-added while stirring at 12,000 rpm by using T. K. Homomixer (manufactured by Tokushu Kika Kogyo Co., Ltd.) to prepare an aqueous medium including a dispersion stabilizer. Further, hydrochloric acid was added to the aqueous medium to adjust the pH to 6.0 and obtain an aqueous medium 1.

Meanwhile, the following materials were put into an attritor (manufactured by Nippon Coke Industries, Ltd.), zirconia particles having a diameter of 1.7 mm were further put into the attritor, dispersion was performed at 220 rpm for 5.0 h, and then the zirconia particles were removed to prepare a dispersion liquid 1 in which a colorant was dispersed.

Styrene: 60.0 parts
Colorant (Pigment Red 122): 6.5 parts

Next, the following materials were added to the prepared dispersion liquid 1.

Styrene: 15.0 parts
N-butyl acrylate: 25.0 parts
Shell resin 1: 4.0 parts
Charge control agent (di-t-aluminum salicylate): 0.7 parts
Hydrocarbon wax (HNP-51, manufactured by Nippon Seiro Co., Ltd.): 9.0 parts
Dodecyl alcohol: 0.5 parts Then, the mixed liquid was heated to a temperature of 60° C. and stirred with T. K. Homomixer (manufactured by Tokushu Kika Kogyo Co., Ltd.) at 9000 r/min to cause dissolution and dispersion. A total of 10.0 parts of a polymerization initiator 2,2'-azobis(2,4-dimethylvaleronitrile) was dissolved therein to prepare a monomer composition. The monomer composition was put into the aqueous medium and granulated for 15 min while rotating CLEARMIX at 15,000 rpm at a temperature of 60° C. Then, the mixture was transferred to a propeller type stirrer and stirred at 100 r/min while reacting at a temperature of 70° C. for 5 h, then heated to a temperature of 80° C. and further reacted for 5 h to produce toner particles.

After completion of the polymerization reaction, the slurry containing the particles was cooled, hydrochloric acid was added, the pH was adjusted to 1.4 or less, the mixture was stirred for 1 h, and then solid-liquid separation was performed with a pressure filter to obtain a toner cake. This was re-slurried with ion-exchanged water to form a dispersion liquid again, and then solid-liquid separation was performed with the above-mentioned filter. The re-slurrying and solid-liquid separation were repeated until the electric conductivity of the filtrate became 5.0 μS/cm or less, and then the solid-liquid separation was finally performed to obtain a toner cake.

The obtained toner cake was dried with an airflow dryer Flash Jet Dryer (manufactured by Seishin Enterprise Co., Ltd.). As for the drying conditions, the blowing temperature was 90° C., the dryer outlet temperature was 40° C., and the toner cake supply speed was adjusted according to the water content of the toner cake so that the outlet temperature did not deviate from 40° C. Further, fine and coarse powders were cut using a multi-division classifier utilizing the Coanda effect to obtain toner particles A1 having a weight average particle diameter (D4) of 6.8 μm.

The physical characteristics are shown in Table 2.

TABLE 2

| Toner particles No. | Shell resin No. | Shell resin Thickness (nm) | Alcohol type | Pigment | Work function Wa (eV) |
|---|---|---|---|---|---|
| A1 | 1 | 22 | 1-Dodecanol | PR122 | 5.45 |
| A2 | 1 | 22 | 1-Octanol | PR122 | 5.45 |
| A3 | 1 | 22 | 1-Octadecanol | PR122 | 5.45 |
| A4 | 1 | 22 | 1-Dodecanol | PR122 | 5.45 |
| A5 | 1 | 22 | 1-Dodecanol | PR122 | 5.45 |
| A6 | 1 | 93 | 1-Hexadecanol | PR122 | 5.45 |
| A7 | 1 | 22 | 1-Decanol | PR122 | 5.45 |
| A8 | 1 | 111 | 1-Dodecanol | PR122 | 5.45 |
| A9 | 1 | 22 | 1-Dodecanol | PR122 | 5.45 |
| A10 | 1 | 1 | 1-Tetradecanol | PR122 | 5.45 |
| A11 | None | — | 1-Dodecanol | PR122 | 5.45 |
| A12 | None | — | 1-Dodecanol | PR122 | 5.45 |
| A13 | 1 | 22 | 1-Dodecanol | Carbon black | 5.73 |
| A14 | 2 | — | 1-Dodecanol | PR122 | 5.45 |
| A15 | 1 | 22 | — | PR122 | 5.45 |
| A16 | 1 | 22 | 1-Hexanol | PR122 | 5.45 |
| A17 | 1 | 22 | 1-Docosanol | PR122 | 5.45 |
| A18 | 1 | 22 | 1-Octadecanol | PR122 | 5.45 |
| A19 | 1 | 22 | 1-Octanol | PR122 | 5.45 |
| A20 | 1 | 22 | 1-Dodecanol | PR122 | 5.45 |

Production Example of Toner 1

The external additives of the types and the number of parts shown in Table 3-1 were externally added and mixed by FM10C (manufactured by Nippon Coke Industries Co., Ltd.) with 100 parts of the obtained toner particles 1. The external addition conditions were as follows: the amount of toner particles charged: 1.8 kg, the rotation speed: 60 $s^{-1}$, and the external addition time: 15 min. Then, the toner 1 was obtained by sieving with a mesh having an opening of 200 μm.

The physical characteristics are shown in Tables 3-1 and 3-2.

TABLE 3-1

| Toner No. | Toner particles No. | Amount of StAc resin (mass %) | Alcohol (mass ppm) | First external additive No. | First external additive parts | Second external additive No. | Second external additive parts |
|---|---|---|---|---|---|---|---|
| 1 | A1 | 82 | 193 | B1 | 0.2 | B12 | 1.0 |
| 2 | A2 | 82 | 193 | B1 | 0.2 | B12 | 1.0 |
| 3 | A3 | 82 | 193 | B1 | 0.2 | B12 | 1.0 |
| 4 | A4 | 82 | 33 | B1 | 0.2 | B12 | 1.0 |
| 5 | A5 | 82 | 296 | B1 | 0.2 | B12 | 1.0 |
| 6 | A1 | 82 | 193 | B11 | 0.2 | B12 | 1.0 |
| 7 | A6 | 82 | 193 | B2 | 0.2 | B12 | 1.0 |
| 8 | A7 | 82 | 193 | B1 | 0.2 | B12 | 1.0 |
| 9 | A8 | 82 | 72 | B3 | 0.2 | B12 | 1.0 |
| 10 | A9 | 82 | 250 | B1 | 0.2 | B12 | 1.0 |
| 11 | A1 | 82 | 193 | B4 | 0.55 | B12 | 1.0 |
| 12 | A1 | 82 | 193 | B5 | 0.5 | B12 | 1.0 |
| 13 | A1 | 82 | 193 | B6 | 0.2 | B12 | 1.0 |
| 14 | A1 | 82 | 193 | B7 | 0.3 | B12 | 1.0 |
| 15 | A10 | 82 | 110 | B8 | 0.15 | B12 | 1.0 |
| 16 | A1 | 82 | 193 | B9 | 0.2 | B12 | 1.0 |
| 17 | A11 | 69 | 193 | B1 | 0.2 | B12 | 1.0 |
| 18 | A12 | 49 | 193 | B10 | 0.2 | B12 | 1.0 |
| 19 | A1 | 82 | 193 | B1 | 0.05 | B13 | 1.0 |
| 20 | A13 | 82 | 193 | B1 | 0.2 | B12 | 1.0 |
| 21 | A14 | 82 | 193 | B1 | 0.03 | B12 | 1.0 |
| 22 | A15 | 82 | — | B11 | 0.55 | B12 | 1.0 |
| 23 | A16 | 82 | 193 | B1 | 0.2 | B12 | 1.0 |
| 24 | A17 | 82 | 296 | B1 | 0.55 | B12 | 1.0 |
| 25 | A18 | 82 | 15 | B11 | 0.55 | B12 | 1.0 |
| 26 | A19 | 82 | 450 | B1 | 0.2 | B12 | 1.0 |
| 27 | A20 | 82 | 296 | B14 | 0.2 | B12 | 1.0 |

TABLE 3-2

| Toner No. | Wa-Wb | Relationship of Wa, Wb, and Wc | Average circularity |
|---|---|---|---|
| 1 | 0.30 | Wb < Wa < Wc | 0.98 |
| 2 | 0.30 | Wb < Wa < Wc | 0.98 |
| 3 | 0.30 | Wb < Wa < Wc | 0.98 |
| 4 | 0.30 | Wb < Wa < Wc | 0.98 |
| 5 | 0.30 | Wb < Wa < Wc | 0.98 |
| 6 | 0.18 | Wb < Wa < Wc | 0.98 |
| 7 | 0.30 | Wb < Wa < Wc | 0.98 |
| 8 | 0.30 | Wb < Wa < Wc | 0.98 |
| 9 | 0.48 | Wb < Wa < Wc | 0.98 |
| 10 | 0.30 | Wb < Wa < Wc | 0.98 |
| 11 | 0.30 | Wb < Wa < Wc | 0.98 |
| 12 | 0.30 | Wb < Wa < Wc | 0.98 |
| 13 | 0.30 | Wb < Wa < Wc | 0.98 |
| 14 | 0.30 | Wb < Wa < Wc | 0.98 |
| 15 | 0.10 | Wb < Wa < Wc | 0.98 |
| 16 | 0.02 | Wb < Wa < Wc | 0.98 |
| 17 | 0.30 | Wb < Wa < Wc | 0.97 |
| 18 | 0.55 | Wb < Wa < Wc | 0.96 |
| 19 | 0.30 | Wb < Wc < Wa | 0.98 |
| 20 | 0.55 | Wb < Wa < Wc | 0.98 |
| 21 | 0.30 | Wb < Wa < Wc | 0.98 |
| 22 | 0.18 | Wb < Wa < Wc | 0.98 |
| 23 | 0.30 | Wb < Wa < Wc | 0.98 |
| 24 | 0.30 | Wb < Wa < Wc | 0.98 |
| 25 | 0.18 | Wb < Wa < Wc | 0.98 |
| 26 | 0.30 | Wb < Wa < Wc | 0.98 |
| 27 | 0.30 | Wb < Wa < Wc | 0.98 |

In the table, the amount of StAc resin is the content ratio (% by mass) of the styrene acrylic resin in the toner.

Production Examples of Toner Particles A2 to A20

Toner particles A2 to A20 were obtained in the same manner as the toner particles 1, except that the type and amount of alcohol, the amount and type of shell resin, and the type of pigment were changed as shown in Table 2. The physical characteristics are shown in Table 2.

Production Examples of Toners 2 to 27

Toners 2 to 27 were obtained in the same manner as toner 1 except that the type and amount of the external additive were changed as shown in Table 3-1. The physical characteristics are shown in Table 3-2. Further, when the amount of the external additives was measured in the obtained toners, it was confirmed that each external additive was contained in the number of parts shown in Table 3-1.

Example 1

The following evaluation was carried out for toner 1. A cartridge filled with the toner 1 obtained above was mounted on a Canon laser beam printer LBP652C, and the following evaluation was performed. As the transfer material, A4 size of CS-680 (basis weight 68 g/cm$^2$) was used. The evaluation was also performed after the above machine was allowed to stand for 3 days in each evaluation environment.

<1> Evaluation of Tip Concentration

The evaluation was performed in a high-temperature and high-humidity (H/H) environment (32.5° C., 80% RH). A solid image was output, the image density for one round of the developing roller from the top of the solid image and the image density for the second and subsequent rounds were measured with a color reflection densitometer (X-Rite 404A), and the evaluation was performed in the following manner based on the difference between these image densities. The evaluation results are shown in Table 4.

A: difference between image densities is 0.05 or less

B: difference between image densities is larger than 0.05 and 0.10 or less.

C: difference between image densities is larger than 0.10 and 0.15 or less.

D: difference between image densities is larger than 0.15

<2> Evaluation of Fogging

The evaluation was performed in a high-temperature and high-humidity (H/H) environment (32.5° C., 80% RH). In the H/H environment, after 1000 sheets with images having a print percentage of 1% were output continuously, one solid white image with a print percentage of 0% was output, and the reflectance (%) thereof was measured with "REFLECTOMETER MODEL TC-6DS" (manufactured by Tokyo Denshoku Co., Ltd.). The evaluation was performed using a numerical value (fogging value) (%) obtained by subtracting the obtained reflectance from the reflectance (%) of the unused printout paper (standard paper) measured in the same manner. The smaller the numerical value, the more the image fogging is suppressed. The evaluation results are shown in Table 4.

Evaluation Criteria

A: fogging value is less than 1.0%

B: fogging value is 1.0% or more and less than 3.0%

C: fogging value is 3.0% or more and less than 5.0%

D: fogging value is 5.0% or more

<3> Ghost Evaluation

The evaluation was performed in a low-temperature and low-humidity (L/L) environment (15.0° C., 10% RH). After 1000 sheets with monochromatic solid white images having a print percentage of 0% were output continuously, a monochromatic ghost determination image was output. The ghost determination image was obtained by arranging seven solid images of 15 mm×15 mm in a horizontal row at 15 mm intervals at a position of 5 mm from the top edge of the transfer paper and forming a halftone image with a toner laid-on level of 0.20 mg/$cm^2$ below these solid images. The difference in density due to the solid image of 15 mm×15 mm in the halftone portion of the image was visually determined. The evaluation results are shown in Table 4.

Evaluation Criteria

A: no difference in density is observed

B: there is a slight difference in density

C: some difference in density is observed

D: difference in density is clearly recognized

<4> Evaluation of Fusion

The evaluation was performed in a high-temperature and high-humidity (H/H) environment (32.5° C., 80% RH). After 7000 sheets with images having a print percentage of 1% were output continuously, the developing container was disassembled and the surface and edges of the toner carrying member were visually evaluated. The evaluation results are shown in Table 4.

Evaluation Criteria

A: there are no circumferential streaks on the surface or edges of the toner carrying member which are caused by foreign matter caught between the toner regulating member and the toner carrying member as a result of toner fracture or fusion B: some foreign matter is caught between the toner carrying member and the toner end seal C: one to four streaks in the circumferential direction can be seen at the ends D: five or more streaks in the circumferential direction can be seen in the entire area.

Examples 2 to 21

The same evaluation as in Example 1 was performed on the toners 2 to 21. The results are shown in Table 4.

Comparative Examples 1 to 6

The same evaluation as in Example 1 was performed on the toners 22 to 27. The results are shown in Table 4.

TABLE 4

| | | Tip density | | Fogging | | | |
|---|---|---|---|---|---|---|---|
| | Toner No. | Rank | Numerical value | Rank | Numerical value | Ghost | Fusion |
| Example 1 | 1 | A | 0.02 | A | 0.5 | A | A |
| Example 2 | 2 | C | 0.15 | C | 4.8 | A | C |
| Example 3 | 3 | C | 0.12 | B | 2.5 | A | A |
| Example 4 | 4 | c | 0.15 | B | 1.6 | A | A |
| Example 5 | 5 | c | 0.12 | C | 4.7 | A | C |
| Example 6 | 6 | B | 0.06 | B | 1.5 | A | A |
| Example 7 | 7 | B | 0.07 | A | 0.9 | A | A |
| Example 8 | 8 | B | 0.07 | B | 2.9 | A | B |
| Example 9 | 9 | B | 0.10 | A | 0.9 | B | B |
| Example 10 | 10 | B | 0.06 | B | 2.8 | A | B |
| Example 11 | 11 | A | 0.05 | B | 1.3 | C | A |
| Example 12 | 12 | B | 0.07 | B | 2.5 | B | A |
| Example 13 | 13 | B | 0.06 | A | 0.5 | A | A |
| Example 14 | 14 | B | 0.10 | A | 0.5 | A | A |
| Example 15 | 15 | A | 0.05 | A | 0.7 | A | A |
| Example 16 | 16 | A | 0.05 | C | 3.5 | A | A |
| Example 17 | 17 | B | 0.07 | B | 1.2 | A | B |
| Example 18 | 18 | B | 0.10 | B | 1.8 | C | B |
| Example 19 | 19 | B | 0.06 | B | 2.8 | B | A |
| Example 20 | 20 | A | 0.02 | B | 2.0 | C | A |
| Example 21 | 21 | B | 0.09 | C | 3.2 | A | B |
| Comparative Example 1 | 22 | D | 0.19 | C | 3.8 | C | A |
| Comparative Example 2 | 23 | D | 0.17 | D | 5.5 | A | D |
| Comparative Example 3 | 24 | D | 0.26 | D | 7.5 | C | C |
| Comparative Example 4 | 25 | D | 0.19 | D | 5.5 | C | A |
| Comparative Example 5 | 26 | D | 0.29 | D | 7.4 | A | D |
| Comparative Example 6 | 27 | D | 0.25 | D | 6.7 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-095997, filed Jun. 8, 2021, which is hereby incorporated by reference herein in its entirety.

What is claimed is:

1. A toner, comprising:

a toner particle comprising a binder resin and a monohydric aliphatic alcohol having 8-18 carbon atoms;

the binder resin containing at least one resin selected from the group consisting of a styrene acrylic resin and a polyester resin, and containing no other resins; and an external additive comprising at least one member selected from the group consisting of hydrotalcite particles and alumina particles, wherein a content ratio of the monohydric aliphatic alcohol extracted from the toner with ethanol is 30 to 300 ppm by mass in the toner when measured according to the following protocol (i) mixing 2 g of toner and 18 g of ethanol to produce a mixture, (ii) irradiating the mixture with ultrasonic waves for 5 min, (iii) allowing the mixture to stand in a thermostat at 60° C. for a whole day and night after irradiation with ultrasonic waves, and further allowing the mixture to stand at room temperature for three additional days, (iv) filtering a supernatant of the mixture after standing through a PTFE syringe filter (pore size 250 nm) to obtain a filtrate, and (v) analyzing the filtrate by gas chromatography to obtain the content ratio of the monohydric aliphatic alcohol extracted from the toner with ethanol.

2. The toner according to claim 1, wherein the external additive comprises hydrotalcite particles having a number average value of major axes of 60 to 820 nm.

3. The toner according to claim 1, wherein the external additive comprises alumina particles having a number average value of major axes of 60 to 820 nm.

4. The toner according to claim 1, wherein a sum total of the content of the hydrotalcite particles and the content of the alumina particles is 0.02 to 1.00 part by mass with respect to 100 parts by mass of the toner particle.

5. The toner according to claim 1, wherein a sum total of the content of the hydrotalcite particles and the content of the alumina particles is 0.05 to 0.50 parts by mass with respect to 100 parts by mass of the toner particle.

6. The toner according to claim 1, wherein the binder resin comprises a styrene acrylic resin, and a content ratio of the styrene acrylic resin in the toner is 50% by mass or more.

7. The toner according to claim 1, wherein 0.05 eV<Wa−Wb<0.50 eV when Wa is a work function of the toner particle and Wb is a work function of the hydrotalcite particle.

8. The toner according to claim 1, wherein 0.05 eV<Wa−Wb<0.50 eV when Wa is a work function of the toner particle and Wb is a work function of the alumina particle.

9. The toner according to claim 1, wherein the toner particle comprises a colorant comprising at least one member selected from the group consisting of C. I. Pigment Violet 19, C. I. Pigment Red 122, C. I. Pigment Red 202, and C. I. Pigment Red 209.

10. The toner according to claim 1, wherein the external additive comprises an external additive C different from the hydrotalcite particles and the alumina particles, and Wb<Wa<Wc when Wa is a work function of the toner particle, Wb is a work function of the hydrotalcite particle, and Wc is a work function of the external additive C.

11. The toner according to claim 1, wherein the external additive comprises an external additive C different from the hydrotalcite particles and the alumina particles, and Wb<Wa<Wc when Wa is a work function of the toner particle, Wb is a work function of the alumina particle, and Wc is a work function of the external additive C.

12. The toner according to claim 1, wherein the external additive comprises the hydrotalcite particles.

13. The toner according to claim 1, wherein the toner particle comprises a core-shell structure comprising a core particle and a shell on a surface of the core particle, the shell comprising a polyester resin, and having a thickness of 0.8 to 100 nm, and the shell being present inside a contour of a cross section of the toner particle in cross-sectional observation of the toner with a transmission electron microscope.

14. The toner according to claim 1, wherein the toner has an average circularity of 0.97 or more.

* * * * *